US008490251B2

(12) United States Patent
Manuel

(10) Patent No.: US 8,490,251 B2
(45) Date of Patent: Jul. 23, 2013

(54) HANDLE FOR PAILS

(75) Inventor: Nathan Manuel, Redondo Beach, CA (US)

(73) Assignee: Rehrig Pacific Company, Los Angeles, CA (US)

(*) Notice: Subject to any disclaimer, the term of this patent is extended or adjusted under 35 U.S.C. 154(b) by 121 days.

(21) Appl. No.: 12/818,252

(22) Filed: Jun. 18, 2010

(65) Prior Publication Data

US 2010/0319161 A1 Dec. 23, 2010

Related U.S. Application Data

(60) Provisional application No. 61/218,336, filed on Jun. 18, 2009, provisional application No. 61/261,400, filed on Nov. 16, 2009.

(51) Int. Cl.
*A47J 45/07* (2006.01)
*A45C 13/26* (2006.01)

(52) U.S. Cl.
USPC .................. 16/444; 16/422; 16/114.1; 16/425

(58) Field of Classification Search
USPC ............ 16/444, 445, 436, 423, 425, DIG. 12, 16/DIG. 19; 220/771, 760, 756, 757, 759, 220/762–765, 769, 773, DIG. 14, DIG. 12
See application file for complete search history.

(56) References Cited

U.S. PATENT DOCUMENTS

| | | | | |
|---|---|---|---|---|
| 3,321,798 | A * | 5/1967 | Plamondon | 16/406 |
| 3,773,249 | A * | 11/1973 | Hidding | 16/410 |
| 3,923,191 | A * | 12/1975 | Johnson | 220/760 |
| 4,091,497 | A | 5/1978 | Bade | |
| 4,176,423 | A * | 12/1979 | Wigemark | 16/406 |
| 4,507,821 | A * | 4/1985 | Jorgensen | 16/409 |
| 4,841,596 | A | 6/1989 | Fink | |
| 4,890,355 | A * | 1/1990 | Schulten | 16/421 |
| 5,029,926 | A * | 7/1991 | Dieterich, Jr. | 294/171 |
| 5,344,041 | A * | 9/1994 | Luburic et al. | 220/760 |
| D362,181 | S | 9/1995 | Meyers et al. | |
| 5,457,850 | A * | 10/1995 | Knox | 220/760 |
| D369,549 | S | 5/1996 | Meyers et al. | |
| 6,014,850 | A * | 1/2000 | LeMire | 53/134.1 |
| 6,022,638 | A * | 2/2000 | Horton et al. | 429/187 |
| 6,049,945 | A | 4/2000 | Prevot et al. | |
| D441,535 | S | 5/2001 | McCalla et al. | |
| 6,256,828 | B1 * | 7/2001 | Sauer | 15/143.1 |
| 2005/0241114 | A1 | 11/2005 | Burney | |
| 2007/0163079 | A1 * | 7/2007 | Cude | 16/114.1 |
| 2008/0276430 | A1 * | 11/2008 | Sharpe | 16/430 |

* cited by examiner

*Primary Examiner* — Chuck Y. Mah
(74) *Attorney, Agent, or Firm* — Carlson, Gaskey & Olds

(57) ABSTRACT

A handle includes a bottom wall and two side walls extending up from the bottom wall. Ribs extend between the walls and define upwardly open recesses. The smooth surfaces of the side walls and bottom wall provide a more comfortable handle for the user.

26 Claims, 5 Drawing Sheets

HANDLE FOR PAILS

This application claims priority to U.S. Provisional Application Ser. Nos. 61/218,336 and 61/261,400 filed Jun. 18, 2009 and Nov. 16, 2009, respectively.

BACKGROUND

The present invention relates generally to plastic handles, such as for pails.

Plastic handles, such as for pails, often include a handle portion with straps extending from either end of the handle portion. The handle portion has a larger diameter than the straps, often by including ribs extending radially outward. The ribs make the handle less comfortable for the user's hand. Sometimes the handle has one flat surface, but there is still pressure on the user's hand from ribs in the handle portion, which is not comfortable when carrying a heavy load.

SUMMARY

A handle includes a bottom wall continuous with two side walls. A plurality of ribs extend between the walls and define upwardly open recesses. These side walls and bottom wall provide a smooth surface for the main contact areas of the user's hand. Most of the weight and pressure on the user's hand will be with the smooth surfaces, not with free ends of the ribs.

DESCRIPTION OF PREFERRED EMBODIMENTS

Figures 1, 2:
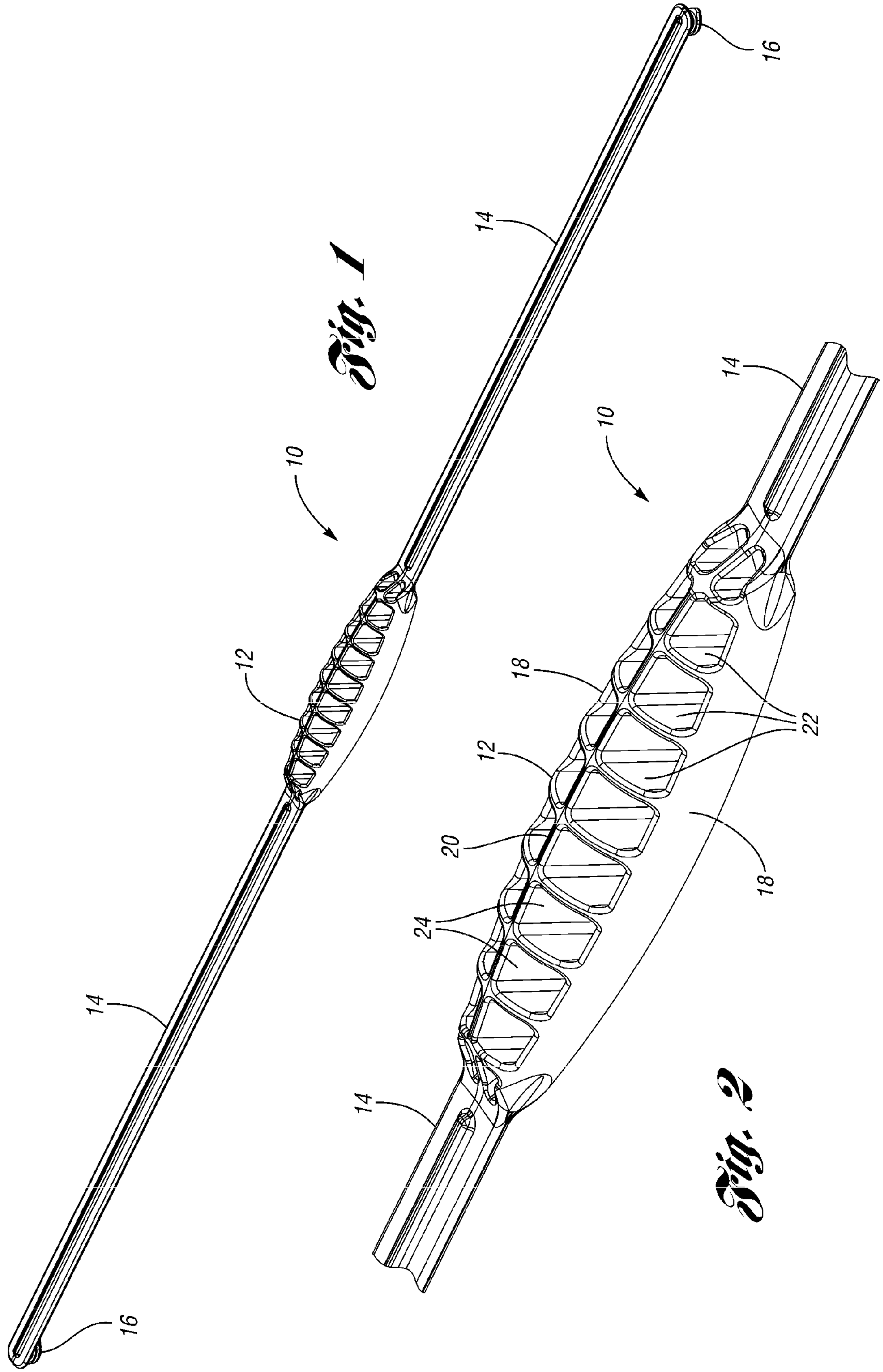
FIG. 1 is a perspective view of a handle according to a first embodiment of the present invention.
FIG. 2 is an enlarged view of the handle portion of the FIG. 1.

A handle 10 according to one embodiment of the present invention is shown in FIGS. 1-6. Referring to FIG. 1, the handle 10 includes a handle portion 12 and straps 14 extending from either longitudinal end of the handle portion 12. Each strap 14 terminates in a connector portion 16, such as a standard snap-in type rotatable connector 16. The handle portion 12, straps 14 and connector 16 are integrally molded as a single piece of a polymer.

FIG. 2 is an enlarged view of the handle portion 12 of FIG. 1. As shown, the handle portion 12 includes side walls 18 and a longitudinal divider rib 20 with transverse lateral ribs 22 connecting the two side walls 18. The side walls 18, longitudinal divider rib 20 and lateral ribs 22 define upwardly open recesses 24. The recesses 24 are defined by coring in the molds, i.e. the parting line of the handle 10 can be parallel to the straps 14, i.e. perpendicular to the dividers 20, 22, with slides to form the connectors 16. Alternatively, the parting line can be perpendicular to the straps 14, with slides to form the recesses 24.

Figure 3:
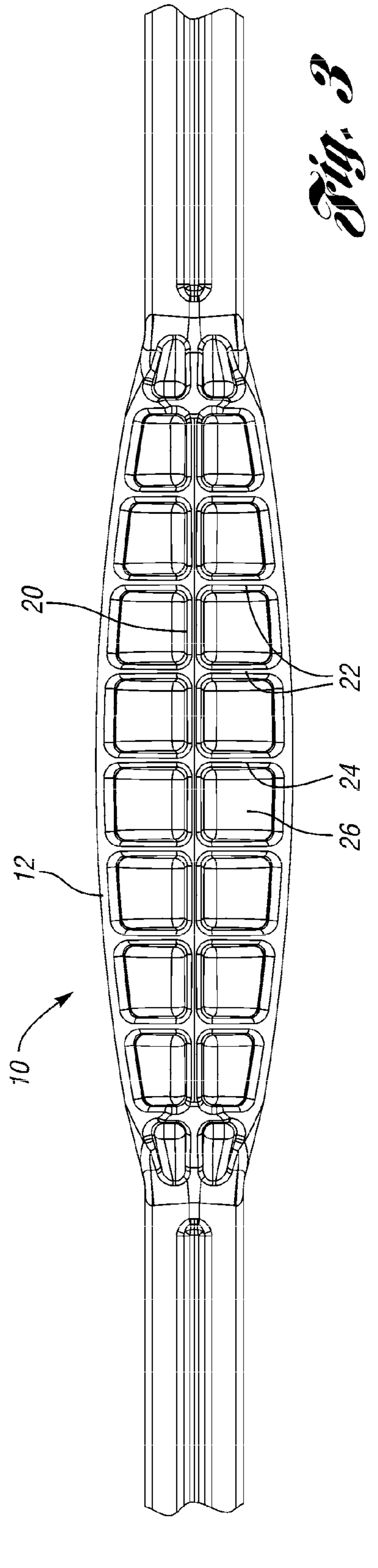
FIG. 3 is top view of the handle portion of FIG. 2.
Figure 4:
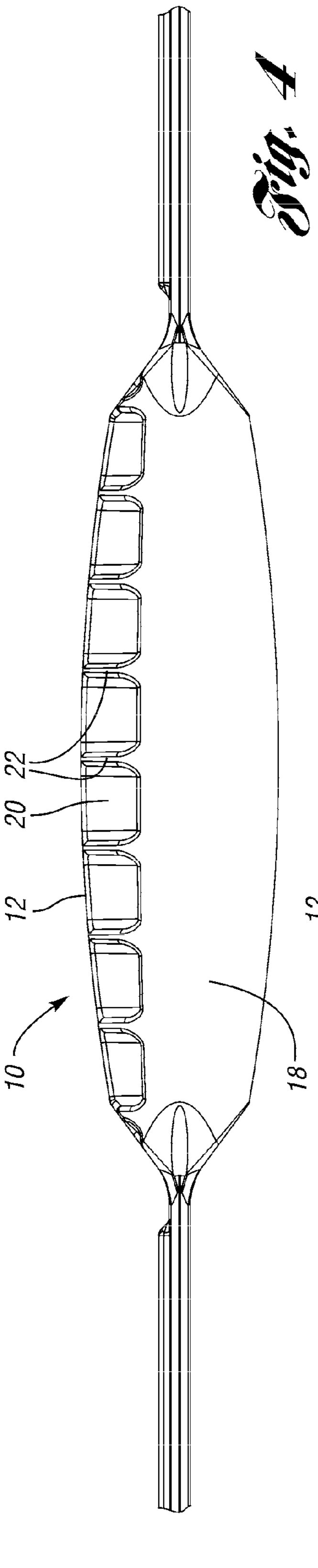
FIG. 4 is a side view of the handle portion of FIG. 2.
Figure 5:
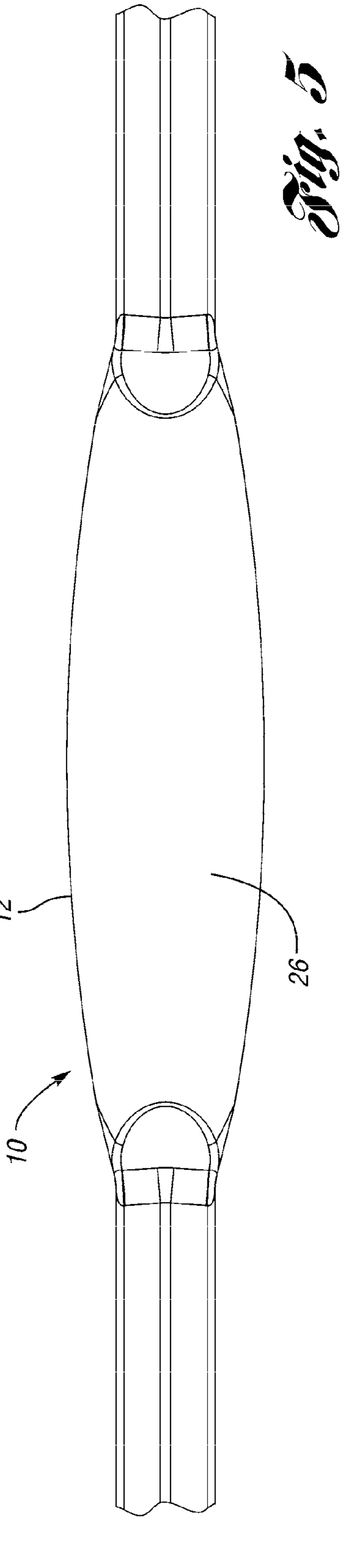
FIG. 5 is a bottom view of the handle portion of FIG. 2.

Referring to FIG. 3, the handle portion 12 further includes a bottom wall 26 continuous with the side walls 18.

Figure 6:
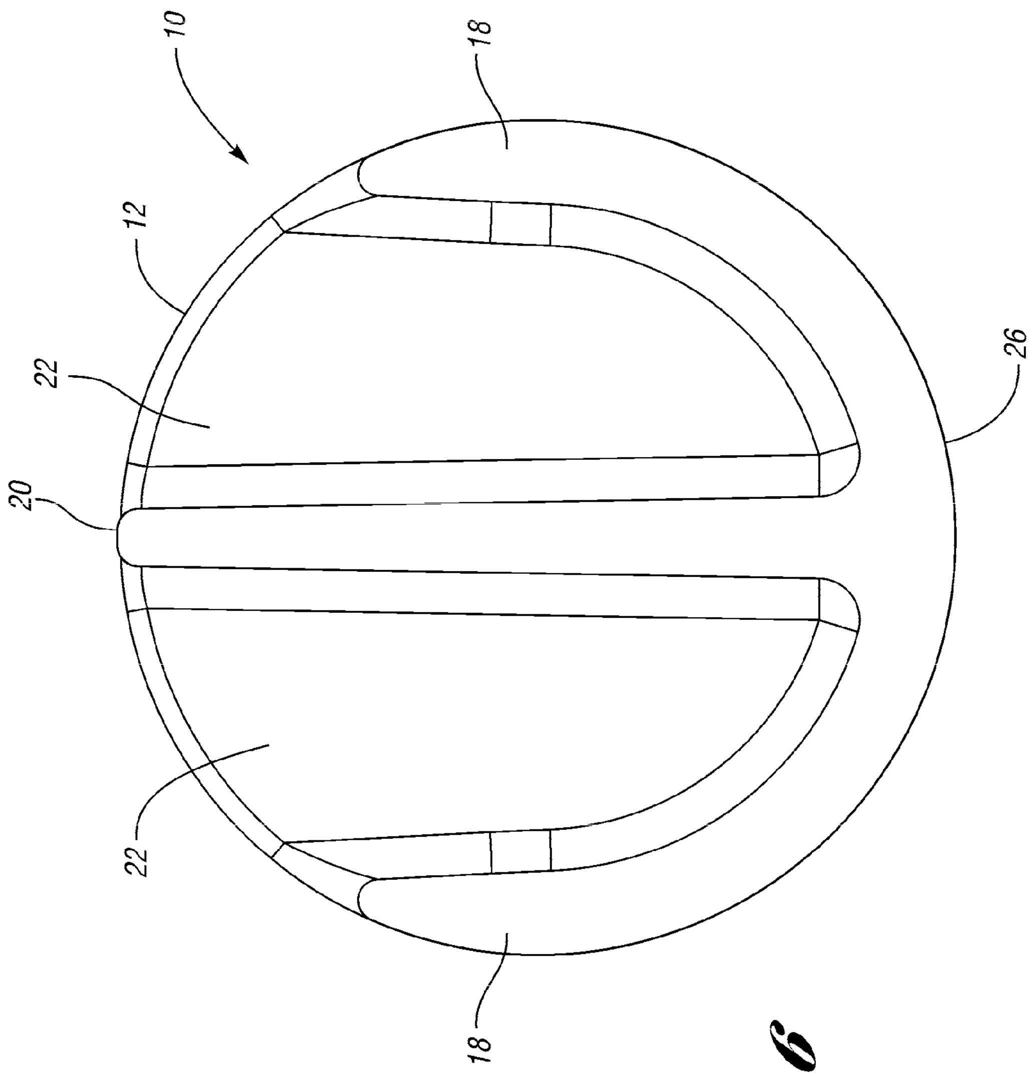
FIG. 6 is a section view through the handle portion of FIG. 2.

Referring to FIG. 6, this provides a continuous surface for the user's hand (side walls 18 and bottom wall 26) on the main contact surfaces. The side walls 18 are more than half the height of the handle 10 and curve inwardly toward one another. The side walls 18 extend upward past a point of the maximum diameter of the handle portion 12 and then curve inward toward one another. Alternatively, the side walls 18 and bottom wall 26 can be considered one continuous wall extending circumferentially around more than 180° of the handle portion 12. This provides a more comfortable and stable handle for the user, particularly when carrying a heavy pail.

Figure 7:
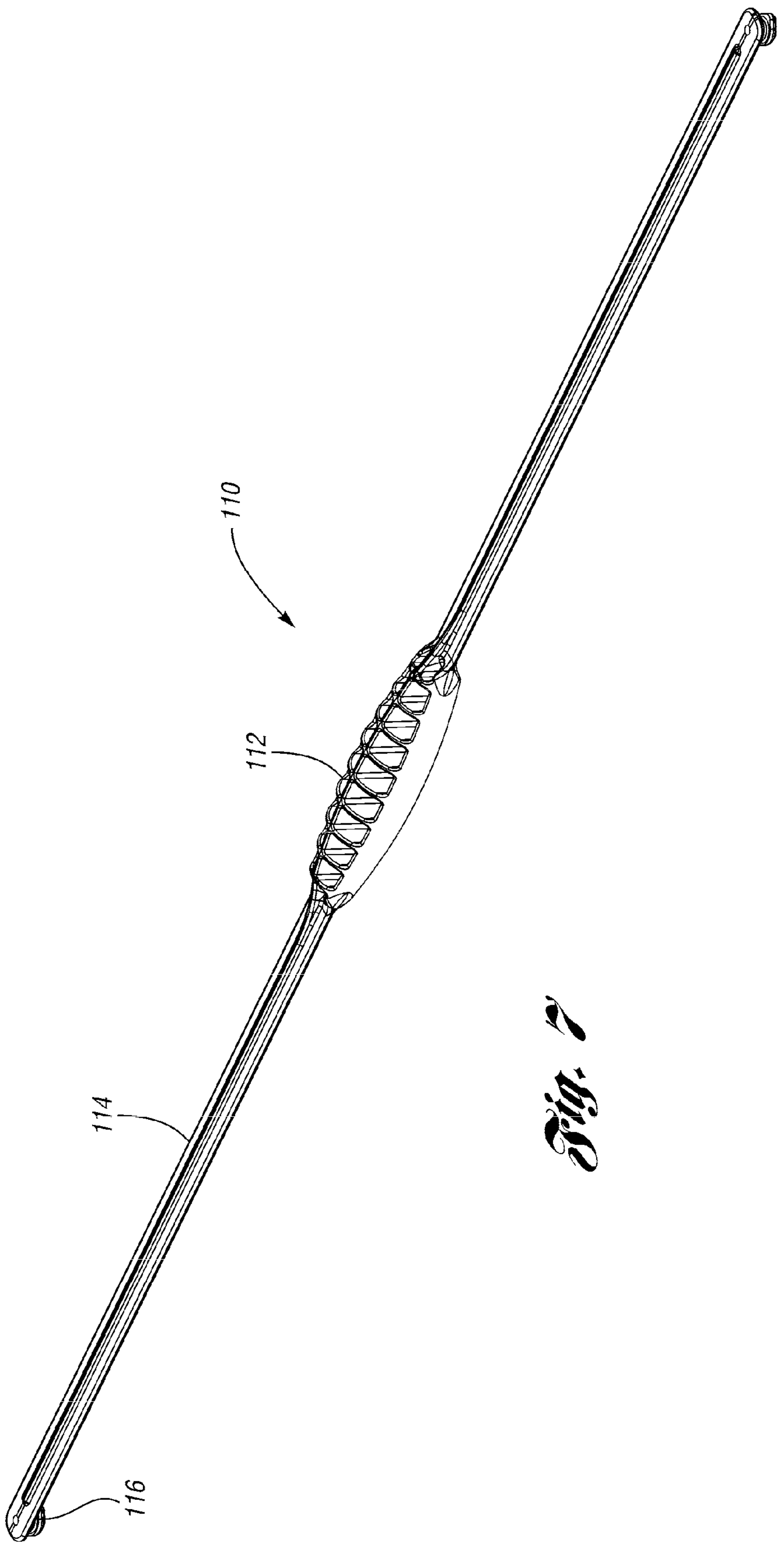
FIG. 7 is a perspective view of a handle according to a second embodiment of the present invention.

A handle 110 according to a second embodiment of the present invention is shown in FIGS. 7-10. Referring to FIG. 7, the handle 110 includes a handle portion 112 and straps 114 extending from either longitudinal end of the handle portion 112. Each strap 114 terminates in a connector portion 116, such as a standard snap-in type rotatable connector 116. The handle portion 112, straps 14 and connector 116 are integrally molded as a single piece of a polymer.

Figure 8:
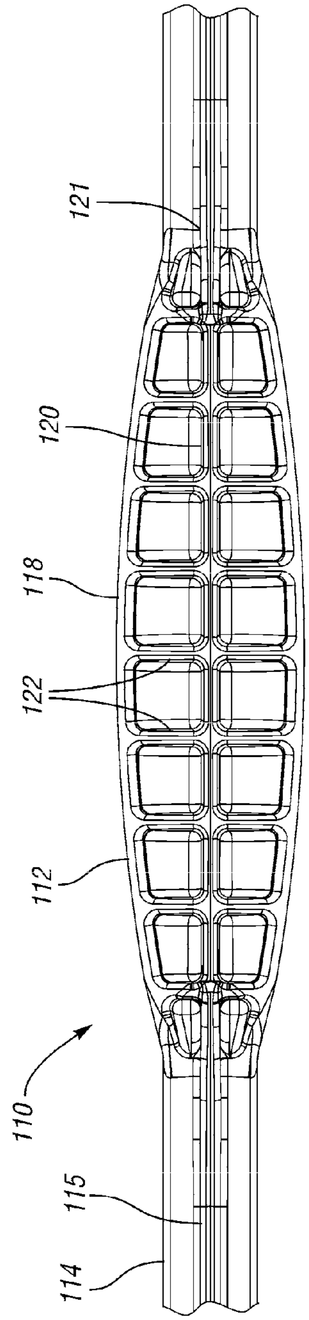
FIG. 8 is a top view of the handle portion of the handle of FIG. 7.

FIG. 8 is an enlarged view of the handle portion 112 of FIG. 7. As shown, the handle portion 112 includes side walls 118 and a longitudinal divider rib 120 with transverse lateral ribs 122 connecting the two side walls 118. The side walls 118, longitudinal divider rib 120 and lateral ribs 122 define upwardly open recesses. The recesses are defined by coring in the molds, i.e. the parting line of the handle 110 can be parallel to the straps 114, i.e. perpendicular to the dividers 120, 122, with slides to form the connectors 116. Alternatively, the parting line can be perpendicular to the straps 114, with slides to form the recesses.

Figure 9:
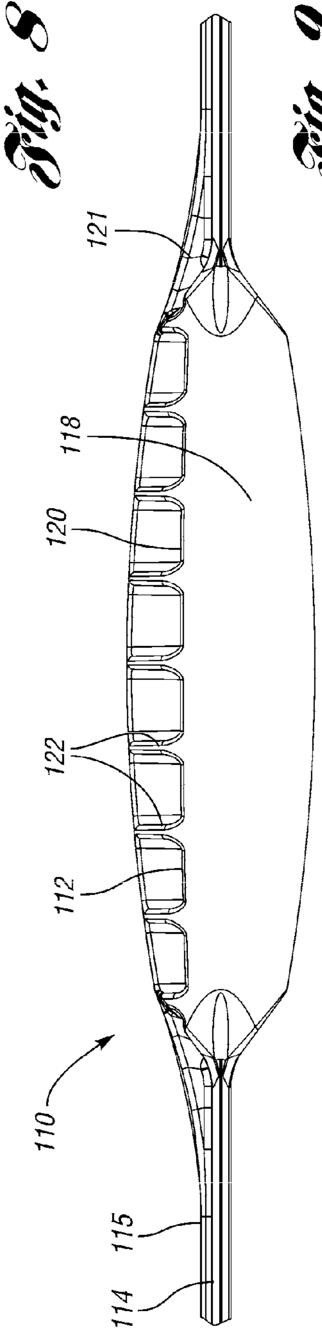
FIG. 9 is a side view of the handle portion of FIG. 8.

In this embodiment, the longitudinal divider rib 120 includes a tapered portion 121 at each end of the handle portion 112, visible in FIGS. 8 and 9, that tapers continuously into a small vertical rib 115 extending substantially the entire length of the strap 114. The vertical rib 115 may project from one or both surfaces of the strap 114.

Figure 10:
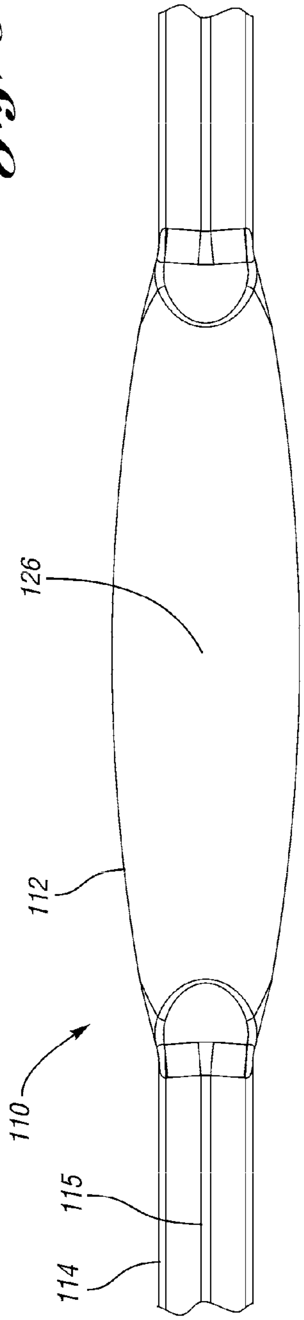
FIG. 10 is a bottom view of the handle portion of FIG. 8.

Referring to FIG. 10, the handle portion 112 further includes a bottom wall 126 continuous with the side walls 18.

The handle 110 provides a continuous surface for the user's hand (side walls 118 and bottom wall 126) on the main contact surfaces. The side walls 118 are more than half the height of the handle 110. Alternatively, the side walls 118 and bottom wall 126 can be considered one continuous wall extending circumferentially around more than 180° of the handle portion 112. This provides a more comfortable and stable handle for the user, particularly when carrying a heavy pail. The handle portion 112 would have the same cross section as FIG. 6.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A handle comprising:

a bottom wall;

a pair of opposed side walls extending continuously upward from the bottom wall such that the bottom wall and the side walls provide a continuous outer surface for contacting a user's hand, the bottom wall and opposed side walls extending in a longitudinal direction, the bottom wall and side walls defining a handle portion, the side walls defining laterally outermost edges of the handle;

a plurality of ribs extending between the side walls and bottom wall, upwardly open recesses defined between the side walls and above the bottom wall; and straps extending from either longitudinal end of the handle portion, wherein the straps are integrally molded with the handle portion.

2. The handle of claim 1, wherein the side walls extend upward away from the bottom wall more than half the height of the handle.

3. The handle of claim 1, wherein the side walls are curved inwardly toward one another and extend upward past a point where the handle has its maximum diameter.

4. The handle of claim 1, wherein the side walls and bottom wall extend continuously circumferentially around more than 180° of the handle.

5. The handle of claim 1, further including an integrally molded connector at an end of each strap.

6. The handle of claim 1 wherein the plurality of ribs includes a longitudinal divider rib that includes a tapered portion at each end of the handle portion that tapers continuously into a vertical rib on each strap.

7. The handle of claim 1 wherein the side walls, the bottom wall and the plurality ribs form a handle portion and wherein the side walls each include an outer surface defining outermost surfaces of the handle portion and wherein the bottom wall includes a lower surface defining a lowermost surface of the handle portion.

8. The handle of claim 1 wherein the bottom wall and the side walls are elongated in a longitudinal direction, the plurality of ribs includes a longitudinal divider rib and a plurality of lateral ribs transverse to the longitudinal divider rib, wherein the side walls are spaced laterally from one another and laterally from the longitudinal divider rib.

9. The handle of claim 8 wherein the bottom wall connects lowermost edges of the side walls.

10. The handle of claim 8 wherein the longitudinal divider rib and the plurality of lateral ribs extend upward from the bottom wall.

11. The handle of claim 10 wherein the plurality of lateral ribs extend from one of the side walls to the other of the side walls and wherein the lateral ribs connect the longitudinal divider rib to the side walls.

12. The handle of claim 1 wherein the bottom wall and the side walls form one continuous wall extending circumferentially around more than 180° of the handle.

13. The handle of claim 1, further including an integrally molded connector at an end of each strap, each connector projecting downwardly from the strap.

14. The handle of claim 1 wherein the straps are long and narrow.

15. The handle of claim 14 wherein the straps are flexible.

16. The handle of claim 14 further including an integrally molded connector at an end of each strap.

17. The handle of claim 1 wherein the bottom wall and the side walls provide a continuous convex outer surface for contacting a user's hand.

18. The handle of claim 17 wherein the bottom wall and the side walls provide a continuous U-shaped cross section.

19. A handle comprising:

a handle portion elongated in a longitudinal direction, the handle portion including a bottom wall and a pair of opposed side walls extending upward away from the bottom wall to define a continuous surface, wherein the side walls and bottom wall extend continuously circumferentially around more than 180° of the handle, the side walls extending upward and outward from the bottom wall and then curving inwardly toward one another past a point where the handle has a maximum diameter; and an elongated strap extending from each longitudinal end of the handle portion, wherein the straps are integrally molded with the handle portion.

20. The handle of claim 19, wherein the side walls extend upward away from the bottom wall more than half the height of the handle portion.

21. The handle of claim 19, further including an integrally molded connector at an end of each strap.

22. The handle of claim 19 wherein upwardly open recesses are defined between the side walls and above the bottom wall.

23. A handle comprising:

a bottom wall;

a pair of opposed side walls extending continuously upward from the bottom wall such that the bottom wall and the side walls provide a continuous convex outer surface for contacting a user's hand, the bottom wall and opposed side walls extending in a longitudinal direction to define a handle portion;

a single-walled longitudinal divider rib extending upward from the bottom wall and facing the side walls upwardly open recesses defined between the longitudinal divider rib and the side walls;

a plurality of lateral ribs transverse to the longitudinal divider rib and extending upward from the bottom wall; and elongated straps each extending from a longitudinal end of the handle portion to a connector portion, wherein the straps are integrally molded with the handle portion.

24. The handle of claim 23 wherein the side walls are curved inwardly toward one another and extend upward past a point where the handle has its maximum diameter.

25. The handle of claim 19 wherein the straps are long, narrow and flexible.

26. The handle of claim 25 further including an integrally molded connector at an end of each strap.

* * * * *